Oct. 10, 1967
J. P. COSENTINO
3,346,288
SAFETY LOCK MEANS
Filed Sept. 1, 1965
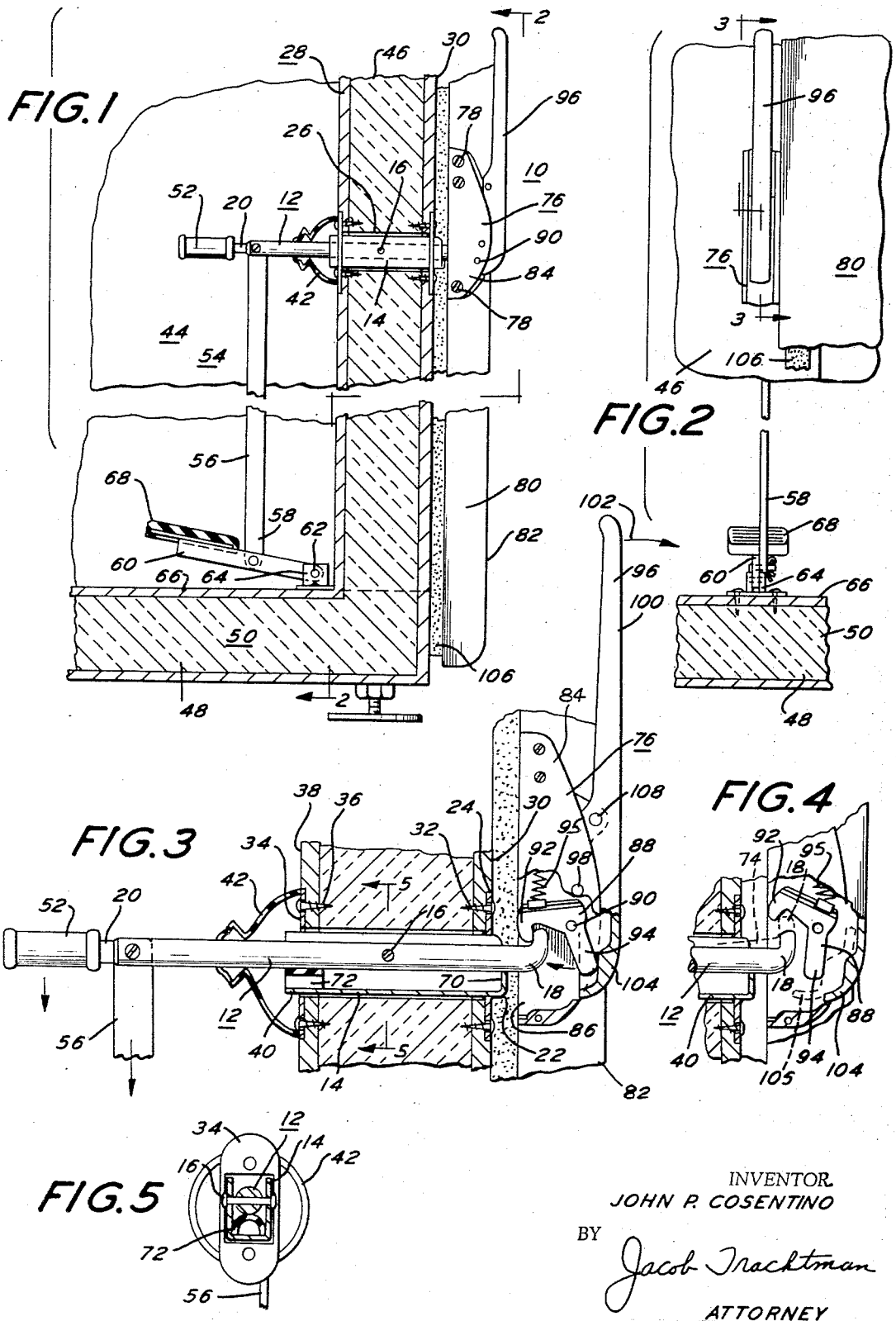
INVENTOR.
JOHN P. COSENTINO
BY
Jacob Trachtman
ATTORNEY United States Patent Office 3,346,288
Patented Oct. 10, 1967

3,346,288
SAFETY LOCK MEANS
John P. Cosentino, 2705 N. Kent Road
Broomall, Pa. 19008
Filed Sept. 1, 1965, Ser. No. 484,345
10 Claims. (Cl. 292—92)

ABSTRACT OF THE DISCLOSURE

Lock means which may be operated inside or outside of a locked structure comprising a locking lever pivotally attached to and extending through a supporting body, and a retaining means including a substantially L shaped latch element pivotally attached, for movement between engaged and disengaged positions, to a member which is to be secured with said body, the element of said retaining means having a first hook end for engaging said lever for securing said body with the member when in its engaged position, and a second end for engagement by said locking lever when in its disengaged position for actuating said element to its engaged position, the lever being pivotally actuated for moving the latch element from its engaged to its disengaged position.

The invention relates to lock means, and more particularly to safety lock means of simplified construction which may be operated from inside a locked structure, even when the outside actuating handle is padlocked.

Many of the prior art lock means, which allow the opening of a lock from the inside or outside of a locked structure are highly complex in construction and operation and therefore do not provide the safety features of my safety lock means.

It is therefore a principal object of the invention to provide a new and improved lock means of highly simplified construction and operation.

Another object of the invention is to provide a new and improved safety lock means which may easily be operated from inside or outside of the locked structure, even when the outside handle operating means is secured against activation.

Another object of the invention is to provide a new and improved safety lock means which allows a direct activation of the hook element of the lock from inside the locked structure for providing simplified operation and a high degree of safety.

Another object of the invention is to provide a new and improved safety lock means which may easily be fabricated, may be inexpensively manufactured, and highly reliable.

The above objects, as well as many other objects of the invention, are achieved by providing a safety lock means such as a lock means for a walk-in type refrigerator, providing for positive release of the locking mechanism from the inside of the structure, by manual actuation. For this purpose the locking means comprises a locking lever to be attached to and extending through a supporting body and a retaining means attached to a member such as the door which is to be secured with the body. The retaining means engages the lever for securing the body with the member. The lever has a first hook end for being engaged by the retaining means, and a second end moveable for releasing the lever from said retaining means. The lever is pivotally moveable with respect to the body between first and second positions with the lever being engageable by the retaining means when it is in its first position and released therefrom when actuated to its second position. Means is provided for normally urging the lever to assume its first position.

The retaining means includes a handle having a first normally closed position and a second open position for releasing the lever. The retaining means also includes a pivotal latch element biased to assume either its first engaging position or its second disengaged position. The lever when positioned in engagement with the retaining means, actuates the latch element of the retaining means from its engaged position to its disengaged position when the lever is actuated from its first position to its second position. The latch element, when in its first engaged position, may also be actuated to its second disengaged position by the handle of the retaining means, when the handle is moved from its first closed position to its second open position. The lever may be provided at its movable ends with a handle for actuating same. A foot actuated lever assembly may also be secured with the second end of said lever for this purpose.

The foregoing and other objects of this invention will become more apparent as the following detailed description of the invention is read in conjunction with the drawing, in which:

FIGURE 1 is a sectional side elevational view with portions broken away showing a safety lock means embodying the invention in closed position for securing a door with a body;

FIGURE 2 is a front elevational view with portions broken away taken on line 2—2 of FIGURE 1;

FIGURE 3 is an enlarged sectional fragmentary view taken on the line 3—3 of FIGURE 2, showing the safety locking means in its locked condition;

FIGURE 4 is a view similar to FIGURE 3, showing the safety locking means in its unlocked position, and FIGURE 5 is a sectional view taken on line 5—5 of FIGURE 3.

Like reference numerals designate like parts throughout the several views.

Referring to the figures, the safety lock means 10 embodying the invention comprises a locking lever 12, pivotally secured with a U-shaped mounting bracket 14 (see FIGURE 5) by a rivet 16 intermediate the hook end 18 and the actuating end 20 of the lever 12. The front end 22 (FIGURE 3) of the bracket 14 is secured with a mounting plate 24.

The lever 12 with its mounting bracket 14 are positioned in an opening 26 through a body 28, which, for example, may constitute the wall of a refrigerator or other enclosure. The attachment plate 24 is positioned along the front surface 30 of the body 28 and secured therewith by screw means 32. A rear end closing plate 34 is also provided and secured by screw means 36 with the inside surface 38 of the body 28 for enclosing the inside end of the opening 26 through the body 28 and positioning the rear end 40 of the bracket 14. The rear end 40 of the bracket 14 and the cover plate 34 may be enclosed by a flexible cup 42 which does not interfere with the pivotal action of the lever 12.

When thus secured, with the body 28, the lever 12 has its hook end 18 extending beyond the front surface 30 of the body 28 while its actuating end 20 extends behind the rear surface 38 of the body 28. Thus, in the case where the body 28 provides a cavity 44 therein, such as that of a refrigerator, the vertical walls 46 and the bottom and top walls 48 (top wall not shown) may be provided with the usual insulating material 50 therein as well as vapor sealing means. Within the chamber 44 the end 20 of the lever 12 is provided with a hand grip 52 for allowing manual pivotal actuation of the lever 12. A foot actuating assembly 54 may also be provided comprising a vertical bar 56 secured with the end 20 of the lever 12 at its top end while its bottom end 58 is secured with an almost horizontal lever 60 hinged at its end 62 with a bracket 64 secured with the bottom surface 66 of the body 28. The forward end of the lever 60 is provided with a foot pedal 68 for downward actuation to manually operate the lever 12. Thus, the lever 12 may be actuated by hand by grasping the grip 52 or by foot by depressing the pedal 68 from within the chamber 44 of the body 28.

The lever 12 of the safety lock means 10 may be pivoted between first and second positions. The first position of the lever 12 is clearly shown in FIGURE 3 in which the hook end 18 abuts against the front vertical wall portion 70 of the bracket 14 which acts as a stop. The lever 12 is normally maintained in its first position, shown in FIGURE 3, by the spring element 72 retained at the rear portion of the bracket 14 which urges the hook end 18 of the lever 12 against the wall portion 70. The downward actuation of the end 20 of the lever 12 moves the lever 12 into its second position indicated by the dashed lines 74 of FIGURE 4, whereby the hook end 18 of the lever 12 is displaced in the upward direction. The lever 12 is also shown in its first position by the solid lines in FIGURE 4.

The retaining means 76 of the safety lock means 10 may be secured by screw means 78 with the side 80 of a movable member 82 which may comprise the door for the body 28 to enclose its chamber 44. The retaining means 76 is provided with a casing 84 having an opening 86 (see FIGURE 3) in the rear thereof for receiving therewithin the hook end 18 of the lever 12. The casing 84 also retains therewithin a latch element 88, pivoting about pin 90 and having a hook engaging portion 92 on one side of said pivot pin and a downwardly pending actuation portion 94 on the other side thereof. The casing also has supported therewithin a spring actuating means 95 which engages the latch element 88, for urging the latch element 88 to assume either a first engaged position or a second disengaged position.

The first engaged position of the latch element 88 is clearly shown in FIGURE 3 whereby its portion 92 engages the hook end 18 of the lever 12 when the lever 12 is in its normal first position. Thus, the retaining means 76 engages the hook end 18 of the lever 12 which extends beyond the front wall 30 of the body 28 and is received within the casing 84 of the retaining means 76 through the opening therein 86. The second disengaged position of latch element 88 is shown in FIGURE 4 and is described more fully below.

The retaining means 76 is provided also with a handle 96 which is hingedly secured with the casing 84 by a pin 98. The handle 96 is provided with spring means (not shown) urging same to assume its first closed position shown in FIGURES 1 and 3. The handle 96 may be actuated to its second open position by movement of its top portion 100 to the right as shown by the arrow 102. When actuated to its second open position, the lower portion 104 of the handle 96 is displaced to the left as shown by the dashed lines 105 of FIGURE 4.

With the safety lock means in its locked position as shown in FIGURE 3, the retention of the hook end 18 of the lever 12 by the hook engaging portion 92 of the latch element 88 prevents the displacement of the member 82 from its position proximate the front wall 30 of the body 28. In this position, the sealing gasket 106, which is positioned about the periphery of the member 82 and may be of the magnetic contact type, provides a seal for enclosing the chamber 44 within the body 28.

When the retaining means 76 of the safety lock means 10 is to be released from outside the chamber 44, the handle 96 is actuated from its first normal position to its open position. Referring to FIGURES 3 and 4, the movement of the lower portion 104 of the handle 96 actuates the contacted portion 94 of the latch element 88 moving it in the clockwise direction. This results in actuation of the latch element 88 from its engaged position shown in FIGURE 3 to its disengaged position shown in FIGURE 4, with the latch element 88 assuming its disengaged position, the hook end 18 of the lever 12 is disengaged and the retaining means 76 is disconnected therefrom, releasing the member 82. When the handle 96 is released, it returns to its normal position, but the pivot element 88 remains in its disengaged position under action of the spring actuating means 95.

In the case where the safety lock means 10 is to be released by actuation within the chamber 44 of the body 28 with the lock means 10 closed as shown in FIGURE 3, the hand grip 52 or the foot actuating assembly 54 is actuated to move the end 20 of the lever 12 in a downward direction for causing the lever to assume its second position. In moving to its second position, the hook end 18 of the lever 12 moves in the upward direction. In doing this, seen from FIGURE 3, the latch element 88 is caused to pivot about its pin 90 to assume its disengaged position as shown in FIGURE 4. With the latch element 88 in its disengaged position, the removal of manual actuation of the lever 12 results in its return to its first position by the biasing means 72 as shown by the solid lines of FIGURE 4. In this position, the hook end 18 clears the engaging portion 92 of the latch element 88 resulting in the release of the hook end 18 of the lever 12 from the retaining means 76. The member 82 may now be readily displaced and removed from its closed position allowing the exit of the person within the chamber 44.

After the retaining means 76 has released the hook end 18 of the lever 12, the retaining means 76 may again be secured with the hook end 18 of the lever 12. As illustrated in FIGURE 4, when the retaining means 76 is in its released position, the latch element 88 assumes its disengaged position, while the handle 96 is returned to its normal closed position indicated by the solid lines leaving the lower portion 104 disengaged from and out of contact with the actuating portion 94 of the latch element 88. The lever 12 is also in its normal position as shown by the solid lines in FIGURE 4. When the member 82 is moved toward its closed position, proximate to the body 28, the hook end 18 enters the opening 86 of the casing 84 of the retaining means 76. As the hook end 18 is received into the casing 84, it contacts the actuating portion 94 of the latch element 88, causing the latch element 88 to move in a counterclockwise direction, about its pivot pin 90. In doing this, the latch element 88 is caused to assume its engaged position, shown in FIGURE 3, whereby the hook engaging portion 92 is now positioned to engage and retain the hook end 18 of the lever 12, thereby locking the safety locking means 10.

The locking means 10 may now be released by actuation of the handle 96 of the retaining means 76 on the outside of the body 28, or by actuation of the lever 12 within the cavity of the body 28 as explained above in detail. In the case where the handle 96 is secured against movement with respect to its casing 84, such as by placing a padlock through the openings 108 and securing the handle 96 with casing 76, the safety lock means 10 may readily be released by actuation of the lever 12 within the cavity 44 of the body 28, as described above. Thus, the handle 96 and the lever 12 provide two independent means, respectively outside and inside the body 28, for positively releasing the safety lock means 10.

The disclosed safety lock means 10 provides a high degree of safety and reliability of operation by allowing same to be released either inside or outside of an enclosed cavity, even when the outside means is locked against actuation, by providing respectively independent releasing means. The safety locking means also provides increased safety by allowing the direct actuation from within an enclosed body of the hook element which acts to secure the safety locking means. The simplicity of the mechanism and its operation is also of advantage, providing a highly reliable and maintenance-free locking device.

It will, of course, be understood that the description and drawings herein contained are illustrative merely, and

What is claimed is:

1. A safety lock means comprising a locking lever pivotally attached to and extending through a supporting body; said locking lever having hook engaging means; and a retaining means including a substantially L shaped latch element pivotally attached for movement between engaged and disengaged positions to a member which is to be secured with said body; said latch element having a first hook end for engaging said hook engaging means of said lever to secure said member to said body when said latch element is in its engaged position, and a second end engageable by said locking lever when in its disengaged position to move said latch element to its engaged position; said locking lever having a portion thereon camming said element to its disengaged position upon pivoting said locking lever whereby said locking lever is released from said retaining means.

2. The safety lock means of claim 1 in which said lever has a first hook end providing said hook engaging means for being engaged by the hook end of the latch element of said retaining means and a second end pivotally movable to actuate the hook end of said element to move said element from its engaged to its disengaged position for releasing said lever from said retaining means.

3. The safety lock means of claim 2 in which said lever is pivotally movable with respect to said body between first and second positions, said lever being engageable by said retaining means when in its first position and released therefrom when actuated to its second position and retained to its first position.

4. The safety lock means of claim 3 in which said lever is provided with means normally urging said lever to assume its first position.

5. The safety lock means of claim 4 in which said retaining means includes a handle having a first normally closed position and a second open position for releasing said lever.

6. The safety lock means of claim 5 in which said retaining means has its pivotal latch element biased to assume either its first engaged position or its second disengaged position, said lever when engaged by said retaining means actuates said element from its engaged position to its disengaged position when said lever is actuated from its first position to its second position.

7. The safety lock means of claim 6 in which the latch element when in its first engaged position is actuated to its second disengaged position by the handle of said retaining means when the handle is actuated from its first closed position to its second open position.

8. The safety lock means of claim 7 in which said lever is provided with a housing unit pivotally supporting said lever and having means for being secured with said supporting body with the hook end of said lever extending beyond the outside wall of said body and the second end of said lever extending beyond the inside wall of said body, so that the safety lock means can be released by actuating the second end of the lever at the inside wall of said body and the safety lock means can be released by actuating the handle of said retaining means at the outside wall of said body.

9. The safety lock means of claim 8 including a hand grip means attached to the second end of said lever for actuating said lever from its first position to its second position.

10. The safety lock means of claim 8 including a foot actuated lever assembly for being secured with said body and connecting with the second end of said lever for actuating said lever from its first position to its second position.

References Cited

UNITED STATES PATENTS

| | | | |
|---|---|---|---|
| 533,571 | 2/1895 | Tower | 292—255 |
| 1,721,984 | 8/1929 | Bertram | 292—66 |
| 1,937,778 | 12/1933 | North et al. | |
| 2,741,505 | 4/1956 | Courney | 292—341.17 |
| 2,803,956 | 8/1957 | Womer. | |
| 2,830,547 | 4/1958 | Zieche | 292—341.15 X |

FOREIGN PATENTS

| | | |
|---|---|---|
| 442,718 | 2/1936 | Great Britain. |

MARVIN A. CHAMPION, *Primary Examiner.*

EDWARD C. ALLEN, *Examiner.*

J. R. MOSES, *Assistant Examiner.*